US009253097B1

(12) United States Patent
Barman et al.

(10) Patent No.: US 9,253,097 B1
(45) Date of Patent: *Feb. 2, 2016

(54) SELECTIVE LABEL SWITCHED PATH RE-ROUTING

(71) Applicant: Juniper Networks, Inc., Sunnyvale, CA (US)

(72) Inventors: Dhiman Barman, Sunnyvale, CA (US); Ina Minei, Mountain View, CA (US); Minjie Dai, San Jose, CA (US); Yimin Shen, Shrewsbury, MA (US); Raveendra Torvi, Nashua, NH (US); Nitin Bahadur, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/042,642

(22) Filed: Sep. 30, 2013

Related U.S. Application Data

(63) Continuation-in-part of application No. 13/730,770, filed on Dec. 28, 2012, now Pat. No. 8,913,490.

(51) Int. Cl.
*H04L 12/24* (2006.01)
*H04L 12/803* (2013.01)

(52) U.S. Cl.
CPC .................... *H04L 47/122* (2013.01)

(58) Field of Classification Search
CPC ......... H04L 45/50; H04L 45/16; H04L 45/00; H04L 45/22; H04L 45/28
USPC ......................................... 370/390, 401, 237
See application file for complete search history.

(56) References Cited

U.S. PATENT DOCUMENTS

| 6,697,329 | B1 | 2/2004 | McAllister et al. |
| 6,728,205 | B1 | 4/2004 | Finn et al. |
| 7,184,437 | B1 | 2/2007 | Cole et al. |
| 7,263,062 | B2 | 8/2007 | Chikazawa et al. |

(Continued)

OTHER PUBLICATIONS

"Link Aggregation and RSVP" NSP, Juniper, Gossamer Threads Inc., May 5, 2010, available at http://www.gossamer-threads.com/lists/nsp/juniper/23047, accessed Dec. 18, 2012, 7 pgs.

(Continued)

*Primary Examiner* — Dang Ton
*Assistant Examiner* — Sai Aung
(74) *Attorney, Agent, or Firm* — Shumaker & Sieffert, P.A.

(57) ABSTRACT

In one example, a method includes establishing a plurality of label switched paths (LSPs) having a common transit network device other than an ingress network device or an egress network device of any of the plurality of LSPs, and, by the transit network device along the plurality of LSPs, detecting a congestion condition on a link along the plurality of LSPs and coupled to the transit network device. The method also includes, responsive to detecting the congestion condition, and by the transit network device, selecting a subset of the plurality of LSPs to evict from the link, wherein the subset comprises less than all of the plurality of LSPs, and updating a forwarding plane of the transit network device to reroute network traffic received for the selected subset of the plurality of the LSPs for forwarding to a next hop on a bypass LSP that avoids the link.

24 Claims, 3 Drawing Sheets

(56) References Cited

U.S. PATENT DOCUMENTS

| | | | |
|---|---|---|---|
| 7,366,120 | B2 | 4/2008 | Handforth et al. |
| 7,519,010 | B1 * | 4/2009 | Aggarwal et al. ............. 370/254 |
| 7,602,702 | B1 * | 10/2009 | Aggarwal ..................... 370/217 |
| 7,680,952 | B1 * | 3/2010 | Pan et al. ...................... 709/239 |
| 7,688,712 | B2 | 3/2010 | Glapin et al. |
| 7,720,061 | B1 | 5/2010 | Krishnaswamy et al. |
| 7,839,862 | B1 * | 11/2010 | Aggarwal .................. 370/395.3 |
| 7,937,492 | B1 * | 5/2011 | Kompella et al. ............. 709/239 |
| 7,940,698 | B1 * | 5/2011 | Minei et al. ................... 370/254 |
| 8,077,726 | B1 | 12/2011 | Kumar et al. |
| 8,085,791 | B1 * | 12/2011 | Aggarwal et al. ............. 370/400 |
| 8,107,360 | B2 | 1/2012 | Patel et al. |
| 8,125,928 | B2 | 2/2012 | Mehta et al. |
| 8,289,878 | B1 | 10/2012 | Gonzalez et al. |
| 8,339,959 | B1 | 12/2012 | Moisand et al. |
| 2003/0103455 | A1 | 6/2003 | Pinto |
| 2004/0085894 | A1 | 5/2004 | Wang et al. |
| 2004/0165525 | A1 | 8/2004 | Burak |
| 2007/0280102 | A1 | 12/2007 | Vasseur et al. |
| 2008/0123651 | A1 | 5/2008 | Vasseur et al. |
| 2009/0175274 | A1 * | 7/2009 | Aggarwal et al. ............. 370/390 |
| 2012/0042077 | A1 * | 2/2012 | Ceccarelli et al. ............ 709/226 |
| 2012/0147740 | A1 | 6/2012 | Nakash |
| 2012/0320753 | A1 * | 12/2012 | Vasseur et al. ................ 370/237 |

OTHER PUBLICATIONS

Pan et al. "Fast Reroute Extensions to RSVP-TE for LSP Tunnels", Network Working Group, RFC 4090, May 2005, 36 pgs.

Awduche et al. "RSVP-TE: Extensions to RSVP for LSP Tunnels" Network Working Group, RFC 3209, Dec. 2001, 62 pgs.

Kompella et al. "Link Bundling in MPLS Traffic Engineering (TE)" Network Working Group, RFC 4201, Oct. 2005, 12 pgs.

De Oliveira et al. "Label Switched Path (LSP) Preemption Policies for MPLS Traffic Engineering" Network Working Group, RFC 4829, Apr. 2007, 20 pgs.

Berger et al. "PathErr Message Triggered MPLS and GMPLS LSP Reroutes" Internet Engineering Task Force (IETF), RFC 5710, Jan. 2010, 13 pgs.

Vasseur et al. "Node Behavior upon Originating and Receiving Resource Reservation Protocol (RSVP) Path Error Messages" Internet Engineering Task Force (IETF), RFC 5711, Jan. 2010, 8 pgs.

Meyer et al. "MPLS Traffic Engineering Soft Preemption" Internet Engineering Task Force (IETF), RFC 5712, Jan. 2010, 14 pgs.

U.S. Appl. No. 13/730,770, by Dhiman Barman, entitled "Selective Notification for Label Switched Path Re-Routing," filed Dec. 28, 2012.

Notice of Allowance from U.S. Appl. No. 13/730,770, dated Aug. 21, 2014, 18 pp.

* cited by examiner

SELECTIVE LABEL SWITCHED PATH RE-ROUTING

This application is a continuation-in-part of U.S. patent application Ser. No. 13/730,770, entitled "SELECTIVE NOTIFICATION FOR LABEL SWITCHED PATH RE-ROUTING," filed Dec. 28, 2012, the entire contents of which are incorporated by reference herein.

TECHNICAL FIELD

The disclosure relates to packet-based computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System—Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generally as label switching routers (LSRs). A set of packets to be forwarded along the LSP is referred to as a forwarding equivalence class (FEC). A plurality of FECs may exist for each LSP, although there may, in some examples, be only one active LSP for any given FEC. Typically, a FEC definition includes the IP address of the destination of the LSP, e.g., an IP address assigned to the egress router of the LSP. In general, each router along the LSP maintains a context that associates a FEC with an incoming label and an outgoing label. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, the LSR performs a lookup in the context and swaps the MPLS label according to the information in its forwarding table based on the lookup and forwards the packet to the appropriate downstream LSR or LER. The egress LER removes the label from the packet and forwards the packet to its destination in accordance with non-label based packet forwarding techniques.

In some computer networks, MPLS traffic may be routed through an "aggregate link," which refers to a logical link representing two or more physical links. Logically, these aggregate links appear as a single interface to the network devices. For example, a bundled link may be a logical construct that represents a way to map information about certain physical resources that interconnect label switching routers with information that is used by constrained Shortest Path First (SPF) for the purpose of path computation, and by MPLS signaling. The aggregate links may also be referred to as "bundled links," or "aggregated bundles." Example aggregate links include aggregated Ethernet links and aggregated SONET links, which may be configured and maintained using a link aggregation control protocol (LACP). Additional details of link bundling in MPLS-TE can be found in K. Kompella, "Link Bundling in MPLS-TE," Network Working Group, RFC 4201, October 2005, the entire contents of which are incorporated by reference herein.

Generally, link aggregation may improve bandwidth in comparison to that of a single link, while also providing connection redundancy. That is, aggregation of links into logical bundles may result in an available bandwidth of all of the bundled links combined. Managing the forwarding of MPLS traffic over bundled links may be problematic in some situations.

SUMMARY

In general, this disclosure describes techniques for re-routing MPLS traffic for label switched paths (LSPs) that traverse a one or more shared resources. The techniques may be applied, for example, by a transit network device along multiple LSPs to selectively notify ingress network devices of the LSPs to prompt one or more of the ingress network devices to re-route a subset of the LSPs. The techniques of this disclosure enable a transit router to selectively evict Traffic Engineering LSPs that traverse a shared resource, causing some of the ingress network devices to reroute some of the LSPs while leaving other LSPs in place to continue forwarding network traffic along the shared resource.

As one example, the shared resource may be a bundled link used by the transit network device to forward traffic for multiple LSPs to a downstream network device. For example, multiple ingress network devices may establish several Traffic Engineering (TE) LSPs that traverse the transit network device and the bundled link. In some cases, the bundled link may become oversubscribed. That is, an amount of bandwidth reserved by LSPs on the bundled link may exceed the amount of bandwidth allowed to be reserved on the bundled link selected for transport of MPLS traffic that exceeds the available bandwidth of the bundled link. In some cases, the bundled link may become congested. For example, if a component link or physical interface associated with the bundled link fails, this reduces the overall capacity and available bandwidth on the bundled link.

In accordance with the techniques of this disclosure, the transit router is configured to treat the link congestion as a link failure for a subset of the LSPs traversing the bundled link. Upon detecting the reduced bandwidth or congestion on the bundled link, the transit router along the path of the TE LSPs can use the techniques of this disclosure to select a subset of the LSPs to evict. The transit router can shift the traffic for the selected subset of LSPs to a bypass LSP, in order to fix the temporary congestion. This may be referred to herein as "soft-FRR" (fast reroute). The transit router can also send a notification to the appropriate ingress routers to trigger the ingress router(s) to compute a new path for the subset of the LSPs to avoid the affected node or link, even if the IGP has not yet updated the bandwidth information. In this manner, the transit router can use MPLS fast reroute techniques not only to address failure of a component link of a bundled link, but also to address congestion of a component link of the bundled link.

In some examples, the transit router may send one or more Path Error messages to the selected ingress router(s) to inform the ingress routers to re-route the appropriate LSPs. In one example aspect, the Path Error message may inform the ingress routers that the bundled link has been over-subscribed or congested. In this way, the transmit router may avoid reroute of all the LSPs traffic engineered to traverse a common aggregate link.

In one example, a method includes establishing a plurality of label switched paths (LSPs) having a common transit network device other than an ingress network device or an egress network device of any of the plurality of LSPs, and, by the transit network device along the plurality of LSPs, detecting a congestion condition on a link along the plurality of LSPs and coupled to the transit network device. The method also includes, responsive to detecting the congestion condition, and by the transit network device, selecting a subset of the plurality of LSPs to evict from the link, wherein the subset comprises less than all of the plurality of LSPs, and updating a forwarding plane of the transit network device to reroute network traffic received for the selected subset of the plurality of the LSPs for forwarding to a next hop on a bypass LSP that avoids the link.

In some examples, after the subset of LSPs has been moved to the bypass LSP, the ingress network device is notified and recomputes paths for these LSPs that had been rerouted. The new paths are computed so that they avoid the link that triggered the reroute operation.

In another example aspect, a network device includes a hardware-based processor, a Resource Reservation Protocol with Traffic Engineering extensions (RSVP-TE) module executing on the hardware-based processor, wherein the RSVP-TE module establishes a plurality of label switched paths (LSPs) having the network device as a common transit network device other than an ingress network device or an egress network device of any of the plurality of LSPs; and a congestion detection module that detects a congestion condition on a link along the plurality of LSPs and coupled to the transit network device. Responsive to detecting the congestion condition, and the RSVP-TE module selects a subset of the plurality of LSPs to evict from the link, wherein the subset comprises less than all of the plurality of LSPs, and the congestion detection module updates a forwarding plane of the transit network device to reroute network traffic received for the selected subset of the plurality of the LSPs for forwarding to a next hop on a bypass LSP that avoids the link.

In a further example aspect, a computer-readable storage medium includes instructions for causing a programmable processor to establish a plurality of label switched paths (LSPs) having a common transit network device other than an ingress network device or an egress network device of any of the plurality of LSPs; detect a congestion condition on a link along the plurality of LSPs and coupled to the transit network device; responsive to detecting the congestion condition, select a subset of the plurality of LSPs to evict from the link, wherein the subset comprises less than all of the plurality of LSPs; and update a forwarding plane of the transit network device to reroute network traffic received for the selected subset of the plurality of the LSPs for forwarding to a next hop on a bypass LSP that avoids the link.

The techniques of this disclosure may provide one or more advantages. One example is for avoiding prolonged traffic loss that might otherwise occur when a link enters into a congested state (as can be the case when one of the member links in a bundle fails). In such a case, there may be traffic loss across all the LSPs crossing the congested link. The congestion may continue until the LSPs are moved away from this link. In extreme cases, if the ingress node is not notified of the congestion, this situation can continue indefinitely. As another example, the techniques of this disclosure can increase network utilization and avoid bandwidth wastage by preventing a situation in which each ingress network device reroutes each of the LSPs, leaving the bundled link underutilized. The techniques of this disclosure can therefore improve the usefulness of bundled links by mitigating a potential risk of deploying aggregated Ethernet or aggregated SONET links in a network.

The techniques of this disclosure can be used by network devices irrespective of whether they are configured to use LSP preemption. The ingress and transit routers do not need to be configured with LSP preemption. The techniques of this disclosure will work even if all the transit LSPs under consideration either have the same or no priorities configured. Preemption can be used as a tool by some network devices to ensure that high priority LSPs can always be routed through relatively favorable paths. The techniques of this disclosure can also provide a useful tool in situations where preemption is configured on the LSPs but there are multiple LSPs having equal priority. That is, the techniques can provide a mechanism for choosing between multiple LSPs having equal preemption priority, and evicting less than all of the multiple LSPs having equal priority. In this manner, the techniques of this disclosure are complementary to the preemption approach. In addition, the techniques of this disclosure can also be used where LSP preemption is not in use. Further details of preemption are described in J. de Oliveira, "Label Switched Path (LSP) Preemption Policies for MPLS Traffic Engineering," Network Working Group RFC 4829, April 2007, the entire contents of which are incorporated by reference herein.

The techniques of this disclosure allow the transit router to inform the respective ingress routers of an oversubscription or congestion condition, so that the ingress routers can act to reroute the LSPs if so desired in response to the notification. This allows the ingress router to reroute the LSP in a make-before-break manner. In addition, the techniques of this disclosure provide more choices to an administrator for managing network bandwidth, and present a plurality of options for how the LSPs are selected to be evicted. In addition, the techniques of this disclosure can apply not just to the case where congestion is caused by a member-link failure, but also to the case where there is congestion for any reason at all (e.g. some LSP is sending too much traffic).

The details of one or more examples are set forth in the accompanying drawings and the description below. Other

DETAILED DESCRIPTION

Figure 1:
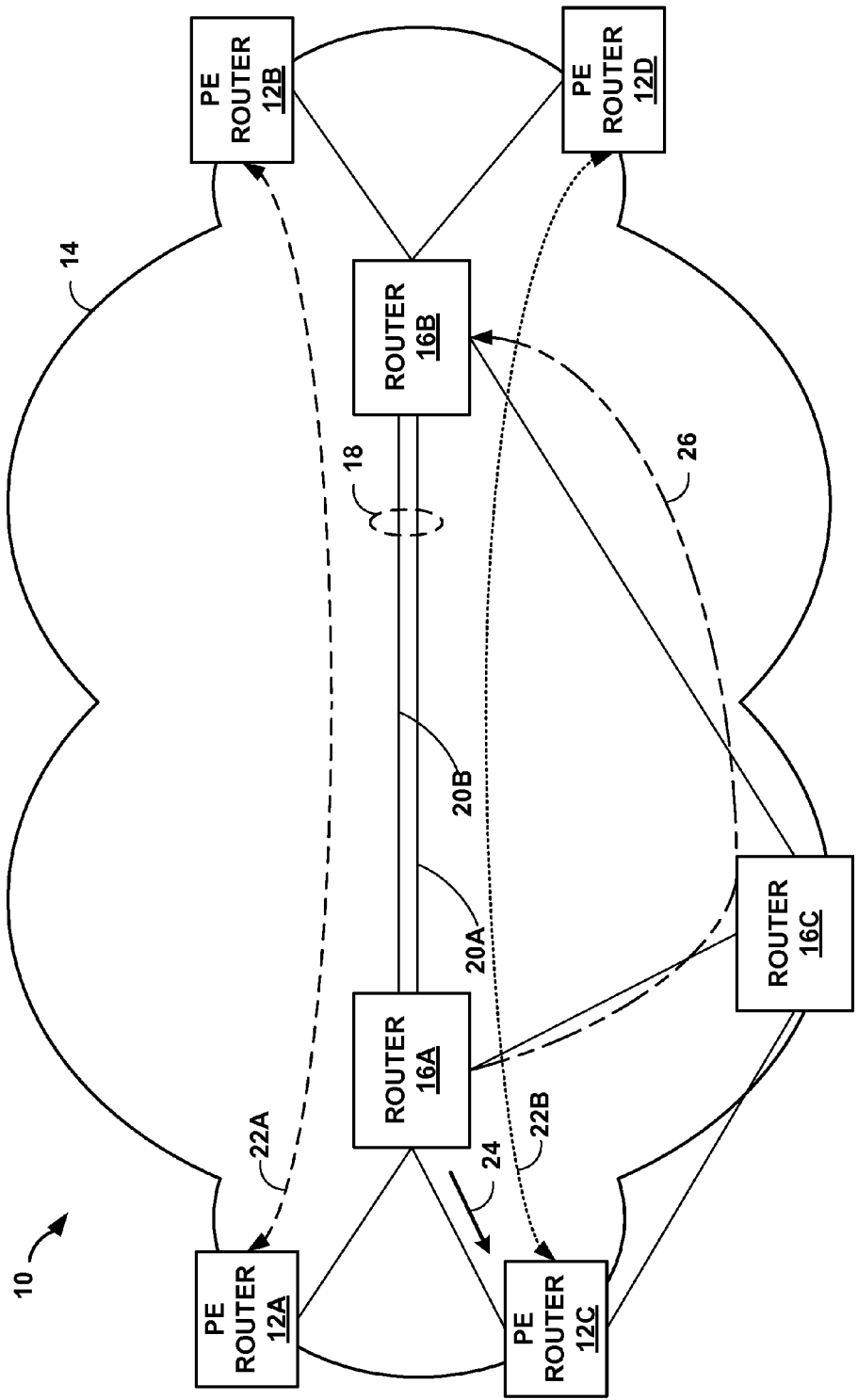
FIG. 1 is a block diagram illustrating an example system in which routers are configured to forward network traffic in accordance with the techniques of this disclosure.

FIG. 1 is a block diagram illustrating an example network system 10 in which provider edge (PE) routers 12A-12D ("PE routers 12") and router 16A-16C ("routers 16") of network 14 are configured to forward network traffic (e.g., network packets) in accordance with the techniques of this disclosure.

In some examples, network 14 may be a service provider network. For example, network 14 may represent one or more networks owned and operated by a service provider (which is commonly a private entity) that offer one or more services for consumption by subscriber networks. In this context, network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

In the example of FIG. 1, router 16A is a transit router along the path of two label switched paths (LSPs) 22A and 22B ("LSPs 22"). That is, as a transit router, router 16A is an intermediate router along LSPs 22 and is neither an ingress router nor an egress router of the LSPs. In this example, PE router 12A is the ingress router of LSP 22A, and PE router 12B is the egress router of LSP 22A. PE router 12C is the ingress router of LSP 22B, and PE router 12D is the egress router of LSP 22B. Both of LSPs 22A and 22B run through transit router 16A, bundled link 18, and transit router 16B. Bundled link 18 is one example of a shared resource that is shared by router 16A. In some examples, the shared resource may be a single link, or a network device, for example.

PE routers 12 and routers 16 represent any network device that routes or otherwise forwards traffic through network 14. Typically, routers 12, 16 represent a L3 packet-switching device that operates at L3 to exchange routing information using a routing protocol, such as an Interior Gateway Protocol (IGP), describing a current topology of network 14. Routers 12, 16 then process this routing information, selecting paths through its representation of the topology of network 14 to reach all available destinations to generate forwarding information. In other words, routers 12, 16 reduce these paths to so-called "next hops" which identify which of its interfaces traffic destined for a particular destination is to be forwarded, where the forwarding information includes this list of next hops. Routers 12, 16 then install this forwarding information in a forwarding plane of the router, whereupon the forwarding plane forwards received traffic in accordance with the forwarding information.

In the example of FIG. 1, bundled link 18 is a bundled link comprised of component links 20A-20B ("component links 20"). Although illustrated with two component links 20, in other examples bundled link 18 may include more than two component links. As examples, bundled link 18 may be an aggregated Ethernet link, and aggregated SONET link, or other aggregated, bundled link.

In some examples, network administrators may use traffic-engineering in network 14 to guarantee characteristics, such as bandwidths of the LSPs 22. To do this, routers 12, 16, may track and advertise in the IGP route advertisements the available bandwidth on each link. Routers 12, 16 can then compute traffic-engineered paths through network 14 taking into account the available bandwidth, and when LSPs 22A and 22B are established, routers 16 adjust an amount of available bandwidth tracked for bundled link 18.

Routers 12, 16 exchange RSVP-TE messages to reserve bandwidth and confirm the reservation. For example, router 16A receives RSVP-TE PATH messages from PE routers 12A and 12C for setting up LSPs 22A and 22B, respectively. In response, router 16A forwards the RSVP-TE PATH messages to router 16B, and also sends RSVP-TE RESV messages back to the ingress routers 12 confirming the reservation of the requested bandwidth. In this way, a total bandwidth provided by aggregate link 18 may be utilized by routers 12, 16 when signaling and provisioning LSPs 22A, 22B.

In some cases, bundled link 18 may become oversubscribed and/or congested. For example, a bundled link may become oversubscribed when bandwidth reserved for use by LSPs 22A, 22B for transport of MPLS traffic through aggregated link 18 exceeds the bandwidth currently available from the aggregated link. For example, an oversubscription condition can occur on a link when the combined demand of all RSVP sessions exceeds a physical capacity of the link (e.g., for example because one of the member links in a bundled link failed).

In some situations, bundledlink 18 may become congested. For example, traffic on the LSPs 22 may not be kept within the bandwidth limits signaled, such as because ingress routers PE 12A, 12C may not use policing. In some examples, link capacity changes dynamically, for example, due to degradation of a radio link or microwave link (e.g., due to weather conditions), or failure of a component link in an aggregate. In other examples, extra unaccounted-for traffic is put on bundled link 18. For example, another network device may redirect traffic on to a bypass LSP (not shown) that traverses bundled link 18 but for which the bypass LSP does not have any bandwidth reservation. When one of these events happens, bundled link 18 may become overloaded and traffic loss may occur, affecting LSPs 22 transiting bundled link 18. Although described for purposes of example in the context of bundled links, the techniques of this disclosure are not limited to bundled links. Rather, the techniques may be applied generally to individual links that may become congested for any of a variety of reasons, including those reasons mentioned above.

Router 16A may be configured with a value that specifies a percentage of an interface (or link's) bandwidth (i.e., physical capacity of a link) that is allowed to be used for reservations. This percentage can be 100%, for example, or more or less than 100%. An allowed bandwidth of greater than 100% would mean that it is permitted to reserve bandwidth amounts greater than a physical capacity of a link (e.g., when the timing of traffic is spread out throughout the day and likely to actually exceed the capacity at any given time). In this case, an oversubscription condition would occur on the link when the combined demand of all RSVP sessions exceeds the configured amount of allowed bandwidth even though that amount of configured bandwidth may exceed the physical capacity of the link.

In one example, component links 20A and 20B may each have a bandwidth capacity of ten Gigabits per second (Gbps), giving bundled link 18 a bandwidth capacity of twenty Gigabits per second. Assume LSP 22A requires five Gigabits per second, and LSP 22B requires twelve Gigabits per second. If component link 20A fails, router 16A detects an oversubscription/congestion condition on bundled link 18, because without the capacity of component link 20A, the overall configured amount of allowed bandwidth for bundled link 18 is suddenly reduced compared to the bandwidth reserved for use by LSPs 22A, 22B. For example, router 16A may use LACP for detecting the component link failure. As another example, router 16A can use a connectivity fault detection protocol session on each component link 20 to detect when failure of the component link occurs. The connectivity fault detection protocol may be, for example, Bidirectional Forwarding Protocol (BFD), Ping, and the like. Router 16A may detect that the amount of reserved bandwidth on bundled link 18 (in this example, seventeen Gbps) exceeds the new amount of available bandwidth after the failure (ten Gbps). Unless and until at least one of LSPs 22 is rerouted, LSPs 22 may observe traffic loss.

Router 16A detects the change in available bandwidth on an interface associated with bundled link 18. In accordance with the techniques of this disclosure, in response to detecting an oversubscription or congestion condition on the bundled link 18, router 16A selects for eviction one or more LSPs that run through the bundled link 18. Router 16A can be configured to use various methods of selecting which LSPs to evict, and several examples are described below. In one example, router 16A determines that evicting LSP 22B, and leaving LSP 22A untouched, will meet the new bandwidth constraint of bundled link 18.

Transit router 16A may have previously signaled bypass LSP 26 as a backup path for protecting bundled link 18. Transit router 16A is the point of local repair (PLR) for bypass LSP 26. Bypass LSP 26 is an LSP, or tunnel, that provides link protection for bundled link 18 between router 16A and router 16B, such that if bundled link 18 should fail, router 16A can tunnel network traffic from an existing LSP through bypass LSP 26. Router 16A may establish bypass LSP 26 in accordance with MPLS fast reroute techniques, as described in P. Pan, Fast Reroute Extensions to RSVP-TE for LSP Tunnels, Network Working Group RFC 4090, May 2005, the entire contents of which are incorporated by reference herein.

For example, as the point of local repair (PLR) and ingress of bypass LSP 26, router 12B may establish bypass LSP 26 to protect one or more other existing LSPs (such as LSPs 22) that traverse at least router 16A and router 16B and do not traverse router 16C. In some examples, router 16A may establish bypass LSP 26 upon request by an ingress router of one of these protected LSPs 22. For example, router 16A may receive an RSVP-TE PATH request from ingress PE router 12A that includes a fast reroute object in which a "local protection desired" flag, or other fast reroute flag, is set. After router 16A establishes bypass LSP 26, router 16A maintains forwarding information in a data plane of router 16A that allows router 16A to send traffic through bypass LSP 26 if bundled link 18 fails.

Responsive to detecting the oversubscription/congestion condition on the bundled link 18, router 16A may perform a soft reroute action to reroute the traffic for just the selected LSP 22B onto a previously-established bypass LSP 26. For example, router 16A may update its stored forwarding state to change the primary next hop for LSP 22B, such as by setting a next hop for bypass LSP 26 as the primary next hop for traffic received for LSP 22B. In some examples, router 16A may delete the previous primary next hop that went over bundled link 18 based on the congestion. In other examples, router 16A may not delete the previous primary next hop for LSP 22B, but may just assign a weight to the next hop such that it is considerably de-preferred.

When performing the soft reroute action, router 16A does not change the forwarding state for LSP 22A over bundled link 18, and does not reroute the traffic received on LSP 22A to the bypass LSP 26. In this manner, router 16A can selectively reroute a subset of the LSPs 22 (less than all of the LSPs 22) from the bundled link 18 onto a bypass LSP 26 to address the detected oversubscription/congestion condition.

Router 16A also sends a notification 24 to PE router 12C, the ingress router of LSP 22B. For example, the notification 24 may be a Path Error message, such as an RSVP-TE PathErr message. PathErr messages are routed hop-by-hop using the path state established when a Path message is routed through the network 14 from the ingress to egress. PathErr messages do not modify the state of any node through which the pass; they are only reported to the ingress of the TE LSP. Further information regarding PathErr messages can be found in J P. Vasseur, "Node Behavior upon Originating and Receiving Resource Reservation Protocol (RSVP) Path Error Messages," RFC 5711, January 2010, the entire contents of which are incorporated by reference herein.

In this example, router 16A does not, however, evict LSP 22A or send a notification to PE router 12A, the ingress router of LSP 22A. Instead, router 16A makes no change to LSP 22A and does not notify PE router 12A of the detected oversubscription. Router 16A allows traffic to continue to be forwarded along LSP 22A over bundled link 18. In this manner, transit router 16A selects a subset of the LSPs 22 to which to be evicted, and sends notifications 24 for only the selected LSPs. In some examples, LSP 22A and LSP 22B may be configured with equal preemption priority levels, and the techniques of this disclosure allow for selecting fewer than all of the LSPs having equal preemption priority. Alternatively, the techniques of this disclosure can also be used when preemption is not configured on the ingress and/or transit routers for the LSPs.

As one example, when LSP 22B is evicted, ingress PE router 12C receives the Path Error message 24 from transit router 16A, and selects a new path that avoids bundled link 18. For example, PE router 12C may send an RSVP-TE PathTear message to router 16A to tear down LSP 22B, and may then re-signal LSP 22B over the path from PE router 12C to router 16C to router 16B to PE router 16D by sending a new RSVP-TE Resv message along this path. In this manner, router 16A can use MPLS fast reroute techniques to address congestion of a component link 20 of bundled link 18. Network capacity planning will have allocated enough bandwidth on the bypass LSP 26 so there would be no traffic loss on LSP 22B.

Transit router 16A sends a corresponding PathErr messages for a given RVSP signaling session and, therefore, for a given LSP, so the example of FIG. 1 only evicts LSP 22B.

Thus, even if ingress router 12C had other LSPs established through router 16A and bundled link 18, ingress router 12C would not necessarily reroute those other LSPs to avoid bundled link 18 upon receiving the PathErr message.

Transit router 16A may use various techniques to notify the appropriate ingress router(s) of the recommended eviction. The ingress PE routers 12A, 12C may be configured to allow LSP preemption on LSPs 22A, 22B. For example, the ingress PE routers 12A, 12C of the LSPs 22A, 22B may, when signaling to establish the LSPs 22, explicitly signal the desire for the LSPs 22 to benefit from a soft preemption mechanism (and thus not to be hard preempted if the soft preemption mechanism is available). For example, the transit router can send the same PathErr message as used when soft preemption is configured, such as a Path Error "Reroute Request Soft Preemption" error value, as described in M. Meyer, "MPLS-TE Soft Preemption," IETF RFC 5712, January 2010, the entire contents of which are incorporated by reference herein. This may include setting a "Soft Preemption Desired bit" in the Session-Attribute Flags of the RSVP signaling messages. Transit router 16A can determine whether preemption is configured for the LSPs based, for example, on the LSP signaling by the ingress router.

As another example, transit router 16A may inform the ingress router(s) of the LSPs to be evicted of the recommended eviction by sending a Path Error message having a newly defined error code, such as a code indicating "link oversubscription detected" as the reason for the Error message. The transit router 16A can notify the ingress routers of the recommended eviction, independent of whether preemption is configured on the ingress routers.

In this way, the techniques of this disclosure allow the transit router 16A to inform the respective ingress routers of an oversubscription condition detected on bundled link 18, so that the ingress routers 12 can act to reroute the LSPs 22 if so desired in response to the notification. This allows the ingress router to reroute the LSP in a make-before-break manner. Unlike conventional preemption methods, no action is taken by the transit router in terms of sending ResvTear message or tearing down LSP sessions. In addition, as described in further detail below, the techniques of this disclosure provide more choices to an administrator for managing network bandwidth, and present a plurality of options for how the LSPs are selected to be evicted.

Figure 2:
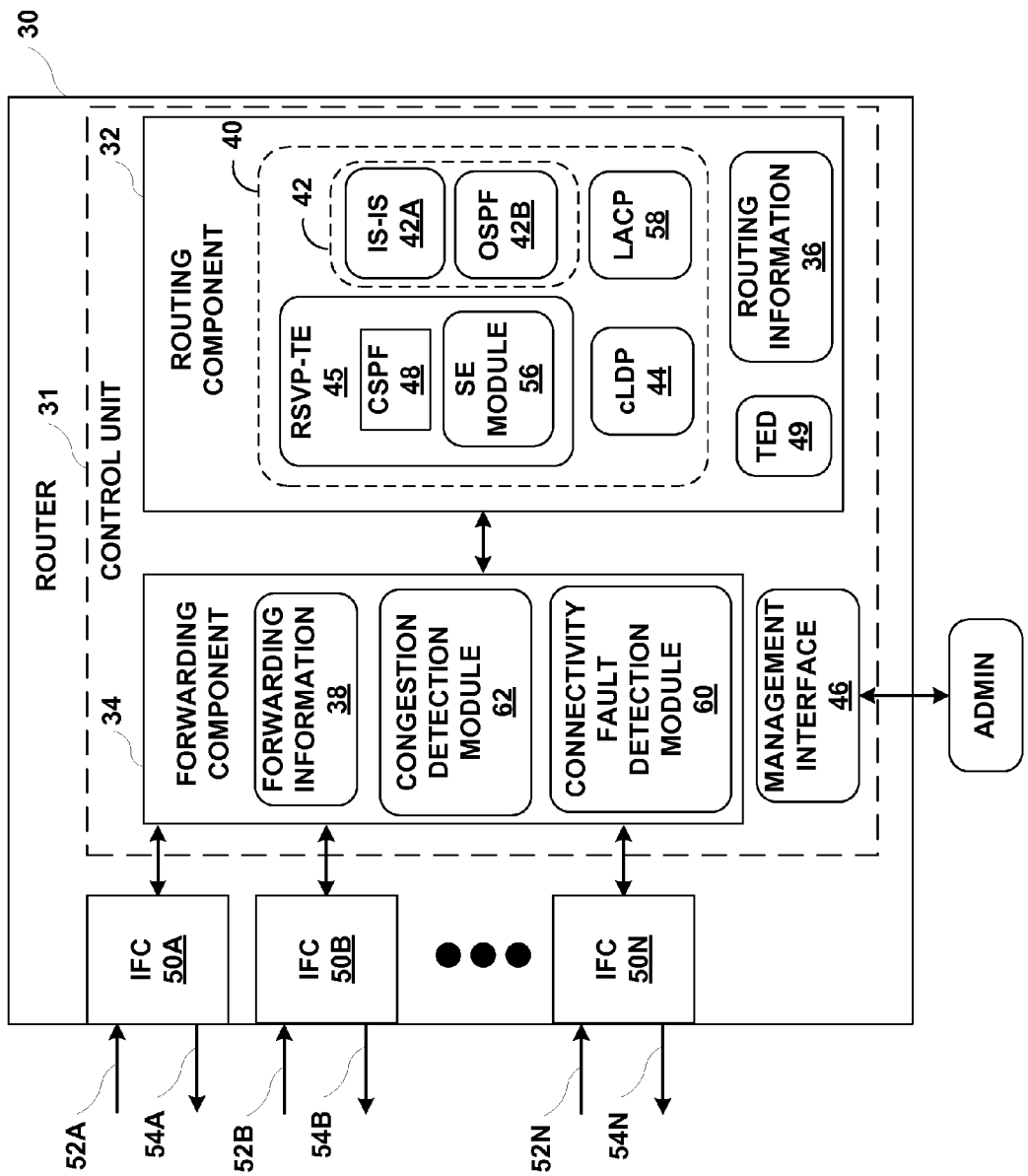
FIG. 2 is a block diagram illustrating an example embodiment of a network device in accordance with the techniques of this disclosure.

FIG. 2 is a block diagram illustrating an example an exemplary router 30 in accordance with this disclosure. Router 30 may, for example, represent any of routers 12 or 16 of FIG. 1. In this example, router 30 includes a control unit 31 that comprises a routing component 32 and a forwarding component 34. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing component 32 primarily provides an operating environment for control plane protocols 40. For example, one or more IGP routing protocols 42, such as Intermediate System to Intermediate System (ISIS) routing protocol 42A, or the Open Shortest Path First (OSPF) routing protocol 42B, maintain routing information 36 to reflect the current topology of a network and other network entities to which router 30 is connected. In particular, IGPs 42 update routing information 36 to accurately reflect the topology of the network and other entities. Router 30 may include other example routing protocols such as Border Gateway Protocol (BGP).

Routing component 32 generates and programs forwarding component 34 with forwarding information 38 that associates network destinations with specific next hops and corresponding interfaces ports of IFCs 50 in accordance with routing information 36. Routing component 32 may generate forwarding information 38 in the form of a radix tree having leaf nodes that represent destinations within the network, for example.

Based on forwarding information 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of router 30 can be found in U.S. Pat. No. 8,339,959, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, RSVP-TE 45 may generate and maintain a traffic engineering database 49, including bandwidth reservations for paths associated with MPLS LSPs. Constrained Shortest Path First (CSPF) process 61 computes a shortest path or paths for an MPLS LSP based on specified constraints and bandwidth availability information associated with the links within the network. IGPs 42 may, in turn, advertise the calculated bandwidth availability information in traffic engineering database (TED) 49 to other peer routers. As another example, constrained Label Distribution Protocol (CR-LDP) 44 may send and receive label mapping messages for establishing a LSP.

In addition, routing component 32 includes a link aggregation control protocol (LACP) module 58 that operates to bundle one or more of interfaces associated with links 52, 54 into a bundled link and treat the bundled link as a single logical interface in terms of forwarding. While shown as implementing LACP, control unit 31 may implement or otherwise provide an execution environment for any other type of bundled link protocol capable of establishing bundled links of logical and/or physical interfaces. LACP module 58 generally provides the abstraction to maintain bundled link 18 (FIG. 1).

When operating as a transit router such as router 16A (FIG. 1), router 30 receives RSVP-TE PATH messages from PE routers 12A and 12C for setting up LSPs 22A and 22B, respectively. In response, RSVP-TE module 45 of router 30 forwards the RSVP-TE PATH messages to router 16B, and also sends RSVP-TE RESV messages back to the ingress routers confirming the reservation of the requested bandwidth. RSVP-TE module 45 may also inform IGPs 42, which in turn can update TED 49 with current available bandwidth information. IGPs 42 may also forward the updated current available bandwidth information to other IGP peers. In some cases, IGPs 42 may not perform an IGP update for small changes in bandwidth, and router 30 may be configured with a threshold bandwidth amount that IGPs 42 use to determine when to perform an IGP update. RSVP-TE module 45 may also store MPLS labels to forwarding information 38 for LSPs 22A and 22B.

Subsequent to LSPs 22A and 22B being established, router 30 as the transit router may in some examples detect an oversubscription condition on a bundled link, such as bundled link 18 (FIG. 1). For example, connectivity fault detection module 60 may run a session on each component link of the bundled link, and can detect when one of the component links fails. In some examples, connectivity fault detection module 60 may inform congestion detection module 62 of a component link failure, and congestion detection module 62 will determine whether this results in congestion. In some examples, the bundled link 18 is managed by the kernel of router 30, and the routing protocol daemon (RPD) and/or RSVP-TE module 45 is informed by the kernel if there is any change. RSVP-TE module 45 will react depending on its configuration. In some examples, LACP module 58 may be used to detect the component link failure, and can inform RSVP-TE module 45.

In the example of a one-hop session (IGP) at a transit router adjacent to the failed link, then a Periodic Packet Management Daemon (PPMD) (not shown) of routing component 32 may delegate connectivity fault detection functionality to a forwarding component monitor module (e.g., pfemon). Otherwise, routing component 32 will do fault detection, such as with LACP module 58. Example techniques for connectivity fault detection in a multi-chassis routing system are described in U.S. Pat. No. 7,720,061, filed Aug. 18, 2006, entitled "Distributed Solution for Managing Periodic Communications in a Multi-Chassis Routing System," the entire contents of which are incorporated by reference herein.

In some examples, congestion detection module 62 detects congestion on an aggregated bundle, such as bundled link 18. In some examples, congestion detection module 62 can request RSVP-TE usage statistics from forwarding component 34 detect congestion by comparing the received statistics to configured threshold usage amounts. In some examples, congestion detection module 62 may monitor link usage, such as in terms of number of bytes per second, and compare the link usage to a configured threshold. Congestion detection module 62 may continuously or periodically check the usage. In some examples, congestion detection module 62 can look at the signaled bandwidth, and determine whether the signaled bandwidth exceeds a threshold amount for bundled link 18. The threshold amount of bandwidth may, in some examples, be based on percent of utilization of a reserved bandwidth of the link. Congestion detection module 62 may determine that the reserved amount of bandwidth exceeds the configured percentage of the bundled link interface's bandwidth allowed to be used for reservations. In some examples, congestion detection module 62 may detect a congestion condition in response to detecting any level of congestion, however small; alternatively, congestion detection module 62 may detect a congestion condition only when the level of congestion exceeds some preconfigured threshold level of congestion (e.g., a percentage or absolute value).

In some examples, connectivity fault detection module 60 and congestion detection module 62 may cooperate to detect an oversubscription condition and/or congestion condition. Responsive to detecting an oversubscription condition and/or congestion condition, congestion detection module 62 informs RSVP module 45 in the control plane of router 30 of the detected condition.

Although illustrated for purposes of example as being positioned in the forwarding component 34 (e.g., in the forwarding plane of router 30), congestion detection module 62 could alternatively be located in the control plane of router 30, such as within routing component 32. In the case of congestion detection module 62 being located in the control plane, congestion detection module 62 may poll the forwarding component 34 for statistics and information, and compare the data received from forwarding component 34 to configured congestion thresholds. In one example, congestion detection module 62 may comprise a software application programming interface (API) in the control plane of router 30 that notifies notify the control plane of the status of aspects of forwarding component 34, such as next hop utilization statistics, and forwarding component 34 responds by providing the requested statistics. In this case, congestion detection module 62 would perform the bookkeeping/accounting of bandwidth in the control plane.

In response to RSVP-TE module 45 being informed of an oversubscription/congestion condition, such as by congestion detection module 62, selective eviction module 56 ("SK module 56") examines the set of LSPs that are associated with the bundled link interface and selects one or more of the LSPs to evict to bring the reserved amount of bandwidth within the configured percentage of bandwidth allowed to be used for reservations. Selective eviction module 56 can use any of a plurality of different options of selecting one or more of the LSPs to evict, each option specifying a different algorithm to be used by the transit network device for selecting a set of the plurality of LSPs to evict from the link.

The LSPs being evicted may be point to point (P2P) LSPs, or may be point to multipoint (P2MP) LSPs, for example. There may be a situation where two different branches of the same P2MP traverse a common link, which becomes congested. In this situation, even if only one of the branch LSPs would need to be evicted to satisfy the bandwidth requirements, RSVP-TE module 45 may still evict both of the branch LSPs of the same P2MP LSP. For example, in some cases the two branches may be associated with different sessions in the control plane but a single session in the forwarding plane. RSVP-TE module 45 evicts the LSPs on a per-session basis, so RSVP-TE module 45 may need to evict both branch LSPs if they are associated with a single session in the forwarding plane, for example. In other examples, RSVP-TE module 45 may evict only one of the branch LSPs of the same P2MP LSP, if able.

In some examples, the LSP may be a bi-directional LSP, which is composed of two individual LSPs that traverse the same path in opposite directions. In some examples, if SE module 56 selects one LSP of a bidirectional LSP for eviction and RSVP-TE module 45 reroutes the LSP onto a bypass tunnel, RSVP-TE module 45 may also re-route the other LSP of the bidirectional LSP so that it still travels the same path (e.g., through the bypass tunnel or a different tunnel along the same path) as the other LSP in the bidirectional LSP.

After selecting one or more LSPs along bundled link 18 for eviction to address the congestion condition, selective eviction module 56 of router 16A may update forwarding information 38 to set a next hop to router 16C along bypass LSP 26 as the primary next hop, such as by changing weights associated with the next hops in the forwarding information. In some examples, router 16A may also then delete the next hop along bundled link 18 from the forwarding state.

Router 30 also includes management interface 46 by which an administrator ("ADMIN"), script, or network management system can configure router 30. In some examples, an administrator may manually configure the bandwidth utilization and congestion thresholds to router 30 via management interface 46. In some examples, management interface 46 may be presented locally, or may be used for receiving information by way of an Application Programming Interface (API) from a Software Defined Network (SDN) controller or Path Computation Element (PCE), for example.

Management interface 46 may provide user interface or other interface that presents a plurality of options for selecting an LSP for eviction, and receives an indication of a selection of one or more of the presented options. In some examples, the management interface 46 may present as options two or more of the algorithms specified below in Examples One through Six. In some aspects, management interface 46 may present the options in a simple form, such as "optimize bandwidth usage on link", "minimize number of LSPs displaced," "minimize number of large bandwidth LSPs displaced," "select randomly," or other options from which a selection can be made. Management interface 46 may receive an indication of a selected one of the plurality of options (e.g., as selected by an administrator or network management system), and may inform selective eviction module 56 of RSVP-TE 45 of the selected option. Subsequently, in response to being informed of an over-subscription/congestion condition on a link, selection eviction module 56 can apply the algorithm specified by the selected one of the plurality of options to generate a list of candidate LSPs and to select which LSP(s) to evict from the link.

In some examples, selective eviction module 56 may select the LSP to move to bypass LSP 26 using the following default heuristics, if nothing else is configured by an administrator:
[1] Hold-priority—Worst hold-priority LSP is moved first.
[2] Prefer LSPs for which bandwidth protection is available, that is, LSPs for which a bypass LSP exists and ideally for which reserved bandwidth for the bypass exists, so as not to move the problem around. [3] Ingress router indication of switch-away. For example, the ingress router can set a flag in LSP ATTRIBUTES object to notify other routers while setting up an LSP.

In the above examples, various tie-breaker methods may be used if the LSPs have equal priorities. For example, if all transit LSPs are equal in terms of reserved bandwidth, priorities, and other attributes, the transit router may consider the actual usage statistics of the transit LSPs and will select LSPs for eviction according to lowest usage first policy. If statistics collection is not allowed in a transit router, then the default mechanism may be to choose LSPs randomly.

Selective eviction module 56 can use various features of LSPs 22 to determine which to select for eviction. For example, RSVP-TE module 45 of router 30 may store information regarding LSP priorities and/or information regarding which LSPs 22 were signaled with link protection requested. RSVP-TE module 45 may also store information regarding whether LSPs 22 have been signaled with a "switch-away" flag. The "switch-away" flag is an LSP attribute object in RSVP-TE PATH message that indicates that it is acceptable for a transit router to switch LSP traffic to a bypass LSP responsive to detecting a condition such as congestion. Other characteristics, such as LSP hold-priority in an RSVP session object, may be used for choosing an LSP for eviction from among multiple LSPs. Hold-priority is traditionally used to indicate which LSPs have priority to stay, in case some RSVPs are to be preempted. Further information on LSP priorities are described in D. Awduche, "RSVP-TE: Extensions to RSVP for LSP Tunnels," Network Working Group RFC 3209, December 2001, the entire contents of which being incorporated by reference herein.

In some examples, selective eviction module 56 may be configured to include as one of the selection criteria the criterion of whether preemption is configured on the LSPs. In some examples, if preemption is configured on an LSP, selective eviction module 56 may ignore the preemption and apply the techniques of this disclosure to select the LSP for eviction. As another option, in some examples, if preemption is configured on an LSP, selective eviction module 56 may not ignore the preemption, may apply the preemption and not select the LSP for eviction according to the usual criteria it applies.

RSVP-TE module 45 can store the above information based on RSVP-TE PATH requests received from ingress routers, for example. Selective eviction module 56 can use these features of LSPs 22 as a basis for determining which LSPs to select for eviction in response to detecting a congestion condition on a bundled link 18. In some examples, selective eviction module 56 may be configured to choose one or more LSPs having the lowest hold-priority to be moved to bypass LSP 26. In some examples, selective eviction module 56 may be configured to choose one or more LSPs having link protection enabled to be moved to bypass LSP 26. In some examples, selective eviction module 56 may be configured to choose one or more LSPs having switch-away flag enabled to be moved to bypass LSP 26. The particular order of criteria and which should be included may be user configurable on router 30.

In some example algorithms, selective eviction module 56 may consider for possible eviction only those bandwidths that have non-zero reserve bandwidth, letting through all those LSPs with bandwidths that have zero bandwidth reserved.

Example One

A first example algorithm for selecting which LSPs to evict is designed to minimize the bandwidth wastage in the network. Specifically, the goal in this algorithm is to use the bundled link as efficiently as possible. Assume there are N Traffic Engineering LSPs sharing the link. The optimization can be written as:

Maximize $\Sigma_{i=0}^{N} L_i S_i$
such that
$\Sigma_{i=0}^{N} L_i S_i \leq B$
$L_i \in \{0,1\}, i=1, \ldots, N$
$S_i > 0$ (only consider non-zero bandwidth LSPs),
where $L_i$ is a coefficient that is either 0 or 1, $S_i$ indicates bandwidth with which LSP i is signaled from the corresponding ingress, and where B is the amount of aggregate reservable bandwidth computed after a component link of the aggregate link fails and reduces available bandwidth. When $L_i$ is 1 this means that LSP i is allowed to stay on the link and is not selected for eviction, and when $L_i$ is 0 this means that LSP i is not allowed to stay on the link and is selected for eviction. That is, selective eviction module 56 can select one or more LSPs to evict such that a sum of the reserved bandwidth of those of the plurality of LSPs that were not selected to evict from the link is maximized, and wherein the maximized sum is less than or equal to an amount of reservable bandwidth of the link. The transit router will inform the corresponding ingress routers of the LSPs selected for eviction by sending a notification. All the LSPs for which $L_i=0$ are supposed to be evicted. For example, suppose $L_1=0.1$, and $L_2=0.2$. The algorithm then approximates these values by truncating them such that $L_1=0$, and $L_2=0$, and solves the sum. In this example, only LSPs with $S_i > 0$ are candidates for eviction.

Example Two

A second example algorithm for selecting which LSPs to evict is designed to minimize the number of Traffic Engineering LSPs to be re-routed. The optimization can be written as:

Maximize $\sum_{i=0}^{N} L_i$
such that
$\sum_{i=0}^{N} L_i S_i \leq B$
$L_i \in \{0,1\}, i=1, \ldots, N$
$S_i > 0$ (only consider non-zero bandwidth LSPs),
where $L_i$ is a coefficient that is either 0 or 1, and where $S_i$ indicates bandwidth with which LSP i is signaled from the corresponding ingress, and where B is the amount of aggregate reservable bandwidth computed after a component link of the aggregate link fails and reduces available bandwidth. Similar to the Example One, when $L_i$ is 1 this means that LSP i is allowed to stay on the link and is not selected for eviction, and when $L_i$ is 0 this means that LSP i is not allowed to stay on the link and is selected for eviction. That is, selective eviction module 56 can select one or more LSPs to evict so as to minimize a number of LSPs in the subset of the plurality of LSPs to evict from the link, wherein the sum of the reserved bandwidth for each of the plurality of LSPs that were not selected is less than or equal to an amount of reservable bandwidth of the link. The transit router will inform the corresponding ingress routers of the LSPs selected for eviction by sending a notification. All the LSPs for which $L_i=0$ are supposed to be evicted. In this example, only LSPs with $S_i > 0$ are candidates for eviction.

Various greedy approaches can also be offered. A greedy approach does not have the computational cost of solving an optimization problem. Computation cost could be issue for a transit route which has limited processing power and memory. Moreover, a transit router has to keep track of a large number of LSPs.

Example Three

In this greedy approach, selective eviction module 56 of RSVP-TE 45 at the transit router will sort all the Traffic Engineering LSPs on the link at issue in a decreasing order of reserved bandwidths. Selective eviction module 56 will keep in place on the link all the largest bandwidth LSPs whose aggregate reserved bandwidth $\leq B$. That is, selective eviction module 56 can determine a set of the LSPs which of the LSPs have the largest bandwidth and for which the sum of the bandwidth of the set of the LSPs is less than or equal to an amount of reservable bandwidth of the link, and select the subset as those LSPs of the plurality of LSPs that are not members of the determined set. For the remaining LSPs, router 30 will send notifications informing their respective ingress routers of the need to reroute to avoid the link. The motivation behind this approach is that since it might be difficult to re-route large bandwidth LSPs, it is better to displace smaller bandwidth LSPs.

Example Four

In this greedy approach, selective eviction module 56 of RSVP-TE 45 at the transit router will sort all the Traffic Engineering LSPs in an increasing order of reserved bandwidths. Selective eviction module 56 will keep in place on the link all the smallest bandwidth LSPs whose aggregate reserved bandwidth $\leq B$. That is, selective eviction module 56 will determine a set of the LSPs which of the LSPs have the smallest bandwidth and for which the sum of the bandwidth of the set of the LSPs is less than or equal to an amount of reservable bandwidth of the link, and select the subset as those LSPs of the plurality of LSPs that are not members of the determined set. For the remaining LSPs, router 30 will send notifications informing their respective ingress routers of the need to reroute to avoid the link. The motivation behind this approach is that since re-routing causes network churn, it is better to cause displacement of fewer LSPs.

Example Five

In another example, the LSPs to be evicted can be selected randomly, such that the sum of the reserved bandwidth for each of the plurality of LSPs that were not selected is less than or equal to an amount of reservable bandwidth of the link. In one example of this greedy approach, selective eviction module 56 of RSVP-TE 45 at the transit router will not displace an existing Traffic Engineering LSP with $$\text{probability} = \frac{B}{\sum_{i=1}^{N} S_i},$$

where $S_i$ indicates bandwidth with which LSP i is signaled from the corresponding ingress, and where B is the amount of aggregate reservable bandwidth computed after a component link of the aggregate link fails and reduces available bandwidth. Other method may be used for randomly selecting the LSPs to be evicted such that the sum of the reserved bandwidth for each of the plurality of LSPs that were not selected is less than or equal to an amount of reservable bandwidth of the link. The motivation behind this approach is that sorting has a computation cost, so it is better to avoid sorting and instead select LSPs randomly. Moreover, randomization might reduce synchronization effects during signaling.

Example Six

In another approach, RSVP at the transit router might in one option simply displace all the existing Traffic Engineering LSPs from the link and inform all the affected ingress routers. For example, the techniques of this disclosure may provide a graceful mechanism for the transit router to automatically inform all routers to move all of the LSPs away from a link or node.

After selecting one or more LSPs for eviction and reroute onto bypass LSP 26, selective eviction module 56 reroutes traffic for the selected LSPs onto the bypass LSP 26. For example, selective eviction module 56 may update the forwarding plane by changing the weighting of the next hop associated with bypass LSP 26 to promote this next hop to the primary next hop. Selective eviction module 56 may also remove the primary next hop from the forwarding plane, optionally after a waiting period. Examples of updating forwarding state for fast reroute are described in U.S. Pat. No. 8,077,726, entitled, "FAST REROUTE FOR MULTIPLE LABEL SWITCHED PATHS SHARING A SINGLE INTERFACE," issued Dec. 13, 2011, the entire contents of which are incorporated by reference herein.

Selective eviction module 56 causes RSVP-TE 45 to generate a notification to be sent to the ingress routers of each of the LSPs selected by any of the above example methods. For example, the notification may be an RSVP-TE Path Error message. For example, the Path Error message may be a standard PathErr message used for LSP soft preemption, a PathTear message for tearing down the LSP by hard preemption, or a newly defined Path Error message for indicating an oversubscription condition on the bundled link. In some examples, the Path Error message may specify the bundled link that is oversubscribed (or may specify the interface associated with the bundled link). Router 30 then outputs the Path Error message to the respective ingress routers.

After sending the notification, in the case of soft preemption being configured, in some examples, RSVP-TE module 45 may wait a time period, and if RSVP-TE module 45 does not receive a PathTear message from the ingress router to reroute the LSP so as to avoid the bundled link, RSVP-TE module 45 of router 30 will then itself send a PathTear message to tear down the LSP from the bundled link and remove the LSP from stored state. In the case of hard preemption, RSVP-TE module 45 may immediately tear down the LSP state without waiting. Further information on soft preemption and hard preemption can be found in L. Berger, "PathErr Message Triggered MPLS and GMPLS LSP Reroutes," IETF RFC 5710, January 2010, the entire contents of which are incorporated by reference herein. In some examples, congestion detection module 62 may continue to monitor the congestion of the link, and upon determining that the congestion condition subsides, congestion detection module 62 may inform RSVP-TE module 45 to reroute the LSP from the bypass LSP back to the original path.

In another example, router 30 may operate as an ingress router (head end) of a TE LSP. For example, router 30 may receive a notification sent by a downstream transit router of an LSP of which router 30 is the ingress. For example, the notification may be a Path Error message with a new error code that indicates an oversubscription condition on a bundled link at the transit router. RSVP-TE module 45 of router 30 may be configured to correctly interpret the new Path Error message having the error code, and can reroute the LSP indicated by the Path Error message to avoid the oversubscribed bundled link. For example, in response to receiving the Path Error message, RSVP-TE module 45 can send a Path Tear message for the LSP to be rerouted, and can remove stored state from forwarding information 38 and TED 49, and CSPF 48 computes a new path through network 14 that avoids the bundled link. RSVP-TE module 45 sends a new RSVP Path message along the computed path that avoids the link.

Figure 3:
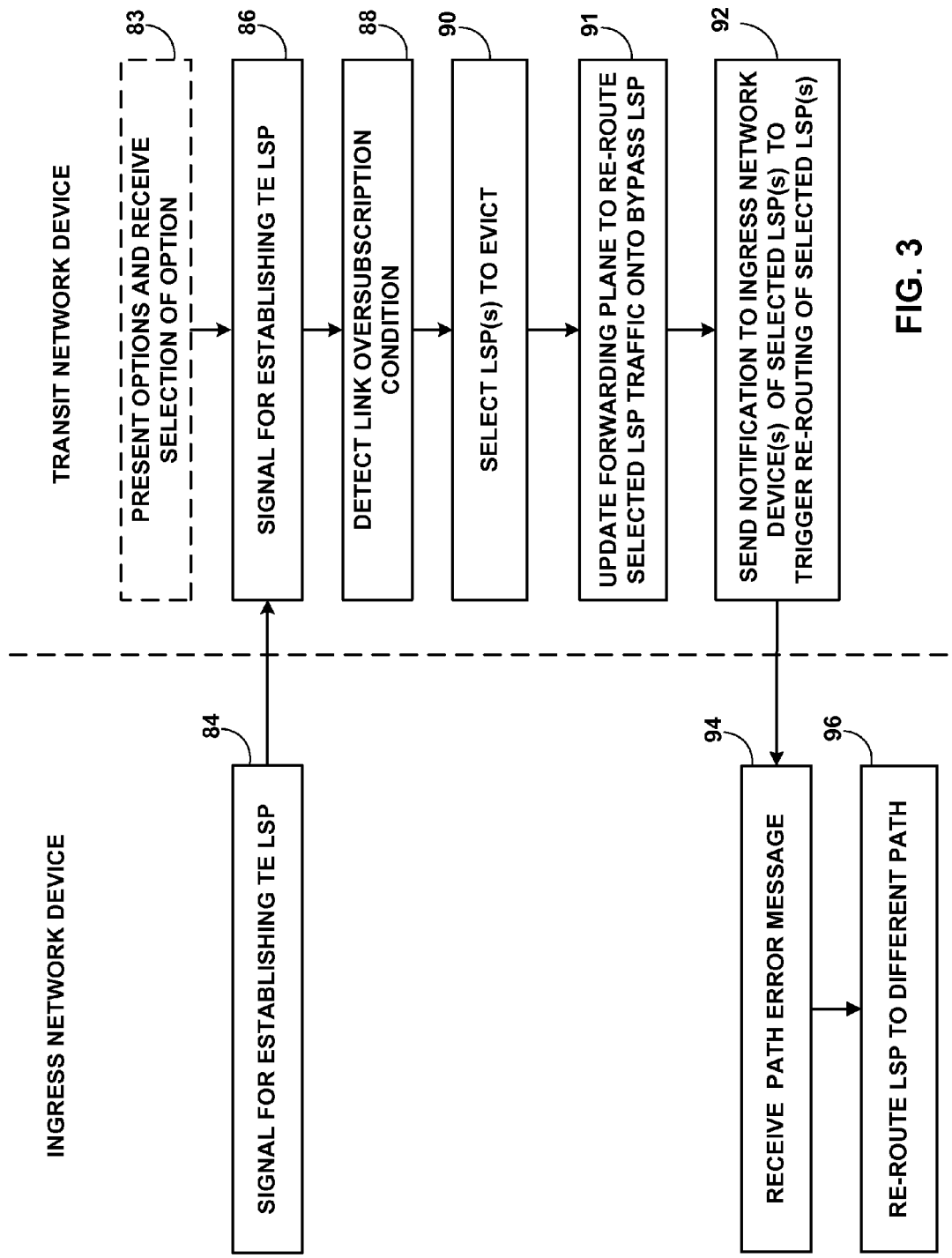
FIG. 3 is a flowchart illustrating example operation of network devices in accordance with the techniques of this disclosure.

FIG. 3 is a flowchart illustrating example operation of network devices in accordance with the techniques of this disclosure. FIG. 3 will be described with reference to FIGS. 1-2 for purposes of example. For example, FIG. 3 refers to an ingress network device and a transit network device, which in one example may be PE router 12C and transit router 16A, respectively.

In some examples, the transit network device may present a management interface, such as management interface 46, which may be, for example, an Application Programming Interface (API) from a Software Defined Network (SDN) controller or Path Computation Element (PCE), or a locally presented interface accessed by an administrator. The management interface of the transit router can present a plurality of options for selecting an LSP for eviction, and receives an indication of a selection of one or more of the presented options (83).

The ingress network device and the transit network device signaling messages to establish a TE LSP (84, 86). For example, PE router 12C and transit router 16A exchange RSVP-TE signaling messages to establish a TE LSP, such as LSP 22B. At the time the LSP is established, there may be multiple LSPs with multiple ingress network devices, and, when established, the sum of the bandwidth of all of the LSPs on the link is within the allowed amount of reserved bandwidth of the link. The link may be a bundled link, in some examples. Subsequent to the LSP being established, the transit network device detects a link oversubscription condition or a congestion condition on a link of the LSP (88). The oversubscription/congestion condition may occur due to a component link of the bundled link having failed, for example, or due to other issues in the network.

Responsive to detecting the oversubscription/congestion condition the transit network device selects for eviction one or more LSPs that run through the bundled link experiencing the condition. For example, selective eviction module 56 of transit router 16A may use one of the example algorithms described above for selecting LSP(s) to evict from bundled link 18 (90). In one example, router 16A selects LSP 22B for eviction from the oversubscribed/congested bundled link. The transit network device updates the forwarding information in its forwarding plane to re-route the traffic received for the selected LSP(s) onto one or more bypass LSPs (91). For example, selective eviction module 56 of router 16A may update forwarding information 38 to set a next hop to router 16C along bypass LSP 26 as the primary next hop, such as by changing weights associated with the next hops in the forwarding information. In some examples, router 16A may also then delete the next hop along bundled link 18 from the forwarding state.

The transit network device also sends a notification message to the ingress router to trigger rerouting of the LSP (92). Various examples of notification messages are described above. For example, the notification may be a Path Error message, such as an RSVP-TE PathErr message. For example, router 16A can send a Path Error message to PE router 12C, the ingress router of LSP 22B, to trigger rerouting of LSP 22B to avoid the link 18. In some examples, the Path Error message may identify the particular LSP 22B to be rerouted. For example, the Path Error message may identify the session ID of the session associated with the LSP 22B. For example, the Path Error message may include a session header from the original PATH message received, which may specify the tunnel ID, router ID of the originating router, and other information, for example.

Ingress PE router 12C receives the Path Error message from transit router 16A (94), and in response RSVP-TE module 45 of ingress PE router 12C examines the Path Error message. The behavior at nodes receiving RSVP PathErr messages is described in JP. Vasseur, "Node Behavior upon Originating and Receiving Resource Reservation Protocol (RSVP) Path Error Messages," RFC 5711, January 2010, the entire contents of which are incorporated by reference herein. In the example of a new error code that specifies an oversubscription condition, RSVP-TE module 45 of ingress PE router 12C may determine that the Path Error message requires RSVP-TE module 45 to reroute the LSP to avoid the oversubscribed link. In response, RSVP-TE module 45 reroutes the LSP to a different path (96). For example, RSVP-TE module 45 invokes CSPF 48 to select a new path that avoids bundled link 18. PE router 12C may send an RSVP-TE PathTear message to router 16A to tear down LSP 22B, and may then re-signal LSP 22B over the path from PE router 12C to router 16C to router 16B to PE router 16D by sending a new RSVP-TE Resv message along this path.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
    establishing a plurality of label switched paths (LSPs) having a common transit network device other than an ingress network device or an egress network device of any of the plurality of LSPs;
    by the transit network device along the plurality of LSPs, detecting a congestion condition on a link along the plurality of LSPs and coupled to the transit network device;
    responsive to detecting the congestion condition, and by the transit network device, selecting a subset of the plurality of LSPs to evict from the link, wherein the subset comprises less than all of the plurality of LSPs;
    outputting an error message to one or more ingress network devices associated with the selected subset of the plurality of LSPs to evict from the link, without outputting an error message to the ingress network devices associated with those of the plurality of LSPs not selected to evict from the link, wherein the error message specifies the respective one of the selected subset of LSPs; and
    updating a forwarding plane of the transit network device to reroute network traffic received for the selected subset of the plurality of the LSPs for forwarding to a next hop on a bypass LSP that avoids the link.

2. The method of claim 1, further comprising:
    by the transit network device, presenting a plurality of options for selection, wherein each of the plurality of options corresponds to a different algorithm to be used by the transit network device for selecting a subset of the plurality of LSPs to evict from the link, wherein the subset comprises less than all of the plurality of LSPs;
    receiving an indication of a selected one of the plurality of options;
    wherein selecting the subset comprises in response to detecting the congestion condition, and by the transit network device, invoking executable instruction in a routing component of a network device to execute the algorithm corresponding to the selected one of the plurality of options to select the subset of the plurality of LSPs to evict from the link, wherein the subset comprises less than all of the plurality of LSPs.

3. The method of claim 1, wherein the next hop of the bypass LSP is previously installed to forwarding information prior to detecting the congestion condition, and wherein updating the forwarding plane comprises making the next hop of the bypass LSP the primary next hop for the selected subset of the plurality of the LSPs.

4. The method of claim 1, further comprising subsequent to rerouting the network traffic to a next hop on a bypass LSP, deleting a previous primary next hop associated with the selected subset of the plurality of the LSPs.

5. The method of claim 1, wherein the link is a bundled link composed of two or more component links, and wherein detecting the congestion condition comprises detecting the congestion condition in response to determining that one or more of the component links has become inoperable.

6. The method of claim 5, further comprising by the transit network device, detecting that one or more of the component links becomes inoperable using a connectivity fault detection protocol.

7. The method of claim 1, wherein detecting the congestion condition comprises detecting that a bandwidth capacity of the link has become reduced.

8. The method of claim 1, wherein detecting the congestion condition comprises detecting that the link is experiencing congestion, wherein the congestion is due to un-policed traffic being sent on the link.

9. The method of claim 1, wherein outputting the error message comprises outputting an Resource Reservation Protocol with Traffic Engineering extensions (RSVP-TE) PathErr message.

10. The method of claim 9, wherein the RSVP-TE PathErr message comprises a Soft Preemption Reroute Request message that requests the ingress network device to which the message is sent to reroute the selected LSP.

11. The method of claim 9, wherein the RSVP-TE PathErr message specifies an error code that indicates a link congestion condition and requests the ingress network device to reroute the selected LSP to avoid the link.

12. The method of claim 1, wherein outputting the error message comprises outputting an RSVP-TE Path Tear message initiating teardown of the selected LSP, the method further comprising:
    by the transit network device, removing forwarding state associated with the selected LSP prior to receiving a response to the Path Tear message from the associated ingress network device.

13. The method of claim 1, wherein selecting the subset of the plurality of LSPs to evict from the link comprises selecting based on one or more of hold-priority of the LSPs, ingress device indication of switch-away, and bandwidth protection availability.

14. The method of claim 1, wherein selecting a subset of the plurality of LSPs to evict from the link comprises one of:
  selecting one or more LSPs to evict such that a sum of the reserved bandwidth of those of the plurality of LSPs that were not selected to evict from the link is maximized, and wherein the maximized sum is less than or equal to an amount of reservable bandwidth of the link; and
  selecting one or more LSPs to evict so as to minimize a number of LSPs in the subset of the plurality of LSPs to evict from the link, wherein the sum of the reserved bandwidth for each of the plurality of LSPs that were not selected is less than or equal to an amount of reservable bandwidth of the link.

15. The method of claim 1, wherein selectin a subset of the plurality of LSPs to evict from the link comprises:
  sorting LSPs of the plurality of LSPs on the link in decreasing order of reserved bandwidth;
  determining a set of the LSPs which of the LSPs have the largest bandwidth and for which the sum of the bandwidth of the set of the LSPs is less than or equal to an amount of reservable bandwidth of the link; and
  selecting the subset as those LSPs of the plurality of LSPs that are not members of the determined set.

16. The method of claim 1, wherein a subset of the plurality of LSPs to evict from the link comprises:
  sorting LSPs of the plurality of LSPs on the link in increasing order of reserved bandwidth;
  determining a set of the LSPs which of the LSPs have the smallest bandwidth and for which the sum of the bandwidth of the set of the LSPs is less than or equal to an amount of reservable bandwidth of the link; and
  selecting the subset as those LSPs of the plurality of LSPs that are not members of the determined set.

17. The method of claim 1, wherein selecting a subset of the plurality of LSPs to evict from the link comprises randomly selecting the subset of LSPs to evict, wherein the sum of the reserved bandwidth for each of the plurality of LSPs that were not selected is less than or equal to an amount of reservable bandwidth of the link.

18. The method of claim 1, further comprising:
  after the selected subset of the plurality of LSPs have been rerouted to avoid the link, and by the transit network device, forwarding network traffic on the link using those of the plurality of LSPs that were not selected to evict from the link.

19. A network device comprising:
  a hardware-based processor;
  a Resource Reservation Protocol with Traffic Engineering extensions (RSVP-TE) module executing on the hardware-based processor, wherein the RSVP-TE module establishes a plurality of label switched paths (LSPs) having the network device as a common transit network device other than an ingress network device or an egress network device of any of the plurality of LSPs; and
  a congestion detection module that detects a congestion condition on a link along the plurality of LSPs and coupled to the transit network device,
  wherein, responsive to detecting the congestion condition, the RSVP-TE module selects a subset of the plurality of LSPs to evict from the link, wherein the subset comprises less than all of the plurality of LSPs, and outputs an error message to one or more ingress network devices associated with the selected subset of the plurality of LSPs to evict from the link, without outputting an error message to the ingress network devices associated with those of the plurality of LSPs not selected to evict from the link, wherein the error message specifies the respective one of the selected subset of LSPs, and
  wherein the congestion detection module updates a forwarding plane of the transit network device to reroute network traffic received for the selected subset of the plurality of the LSPs for forwarding to a next hop on a bypass LSP that avoids the link.

20. The network device of claim 19, further comprising:
  a management interface that presents a plurality of options for selection, wherein each of the plurality of options specifies a different algorithm to be used by the transit network device for selecting a subset of the plurality of LSPs to evict from the link, wherein the subset comprises less than all of the plurality of LSPs,
  wherein the management interface receives an indication of a selected one of the plurality of options,
  wherein, in response to detecting an congestion condition on a link along the plurality of LSPs, the RSVP-TE module applies an algorithm specified by the selected one of the plurality of options to select a subset of the plurality of LSPs to evict from the link, wherein the subset comprises less than all of the plurality of LSPs.

21. The network device of claim 19, wherein the link is a bundled link composed of two or more component links, and wherein the RSVP-TE module detects the congestion condition in response to one or more of the component links becoming inoperable.

22. The network device of claim 19, wherein the RSVP-TE module applies an algorithm specified by the selected one of the plurality of options to randomly select the subset of LSPs to evict, wherein the sum of the reserved bandwidth for each of the plurality of LSPs that were not selected is less than or equal to an amount of reservable bandwidth of the link.

23. The network device of claim 19, wherein, after the selected subset of the plurality of LSPs have been rerouted to avoid the link, the network device forwards network traffic on the link for those of the plurality of LSPs that were not selected to evict from the link.

24. A non-transitory computer-readable storage medium comprising instructions for causing a programmable processor to:
  establish a plurality of label switched paths (LSPs) having a common transit network device other than an ingress network device or an egress network device of any of the plurality of LSPs;
  detect a congestion condition on a link along the plurality of LSPs and coupled to the transit network device;
  responsive to detecting the congestion condition, select a subset of the plurality of LSPs to evict from the link, wherein the subset comprises less than all of the plurality of LSPs;
  output an error message to one or more ingress network devices associated with the selected subset of the plurality of LSPs to evict from the link, without outputting an error message to the ingress network devices associated with those of the plurality of LSPs not selected to evict from the link, wherein the error message specifies the respective one of the selected subset of LSPs; and
  updating a forwarding plane of the transit network device to reroute network traffic received for the selected subset of the plurality of the LSPs for forwarding to a next hop on a bypass LSP that avoids the link.

* * * * *